United States Patent [19]

Cole

[11] Patent Number: 5,114,655

[45] Date of Patent: May 19, 1992

[54] METHOD AND APPARATUS FOR INJECTION MOLDING

[75] Inventor: Harold E. Cole, Paradise, Calif.

[73] Assignee: Cole Machine & Mfg. Co., Oakridge, Oreg.

[21] Appl. No.: 598,098

[22] Filed: Oct. 16, 1990

Related U.S. Application Data

[62] Division of Ser. No. 394,934, Aug. 17, 1989.

[51] Int. Cl.⁵ ............................... B29D 1/00
[52] U.S. Cl. ........................ 264/318; 249/59; 249/63; 249/64; 249/144; 249/184; 425/438; 425/577; 425/DIG. 58; 425/443
[58] Field of Search ................ 249/68, 59, 63, 64, 249/144, 184, 443; 264/318; 425/438, 577, DIG. 58

[56] References Cited

U.S. PATENT DOCUMENTS

| | | | |
|---|---|---|---|
| 3,915,613 | 10/1975 | Ruch | 425/438 |
| 4,541,795 | 9/1985 | Cole | 425/438 |
| 4,552,328 | 11/1985 | Dutt et al. | 425/438 |

*Primary Examiner*—David A. Simmons
*Assistant Examiner*—Merrick Dixon
*Attorney, Agent, or Firm*—McCubbrey, Bartels, Meyer & Ward

[57] ABSTRACT

A method and apparatus are described for forming a closure device having a cylindrical plug and a cylindrical collar extending coextensively and coaxially from a cap. The apparatus includes an outer mold defining an injection mold cavity. A cylindrical hollow outer core extends into the injection mold cavity and a cylindrical inner core extends into the injection mold cavity within the hollow outer core. Pushing means separate the molded part from the inner core. A stripper separates the part from the outer core by engaging an annular shoulder on the part. The part is pushed free of the mold's inner core after the outer mold is removed but before the stripper is advanced to engage the annular shoulder.

2 Claims, 7 Drawing Sheets

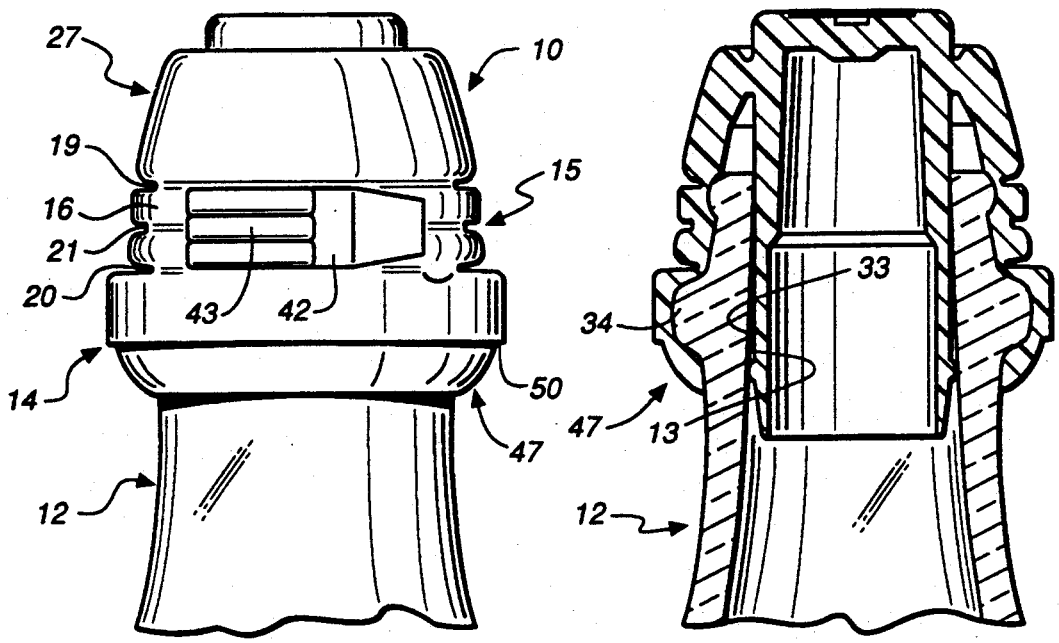
FIG._1  FIG._1A
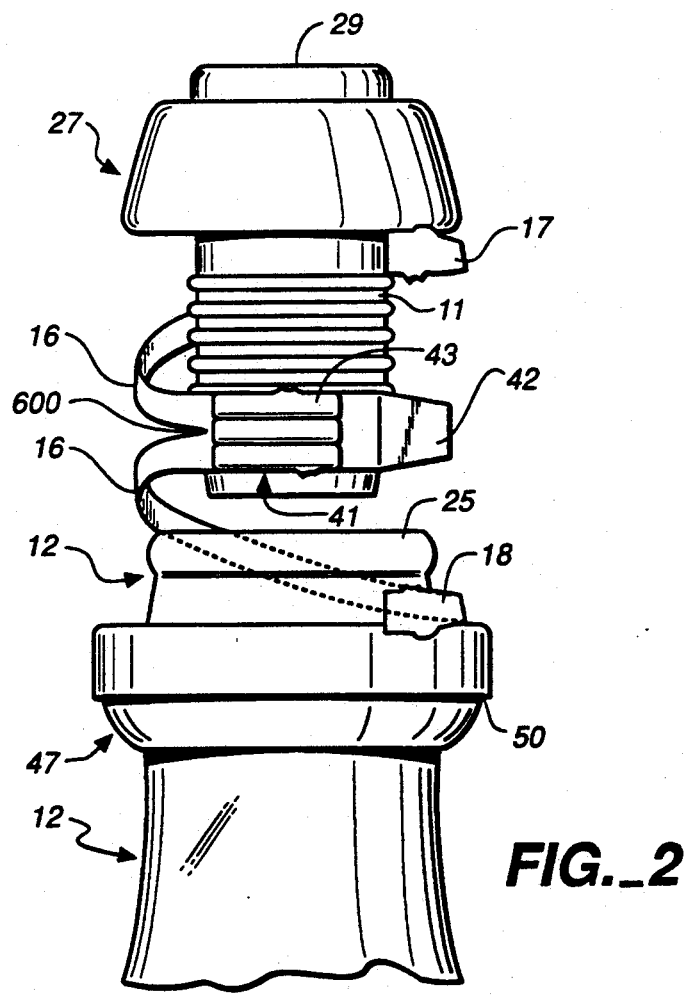
FIG._2

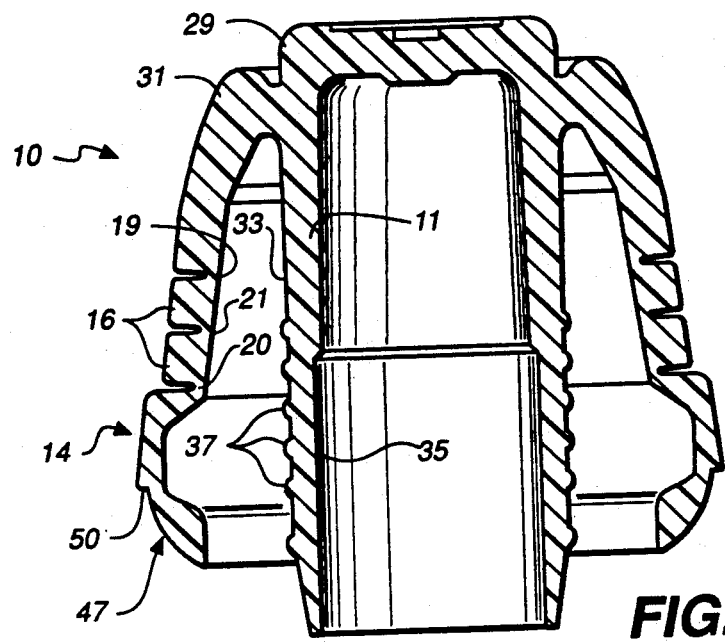
FIG._3
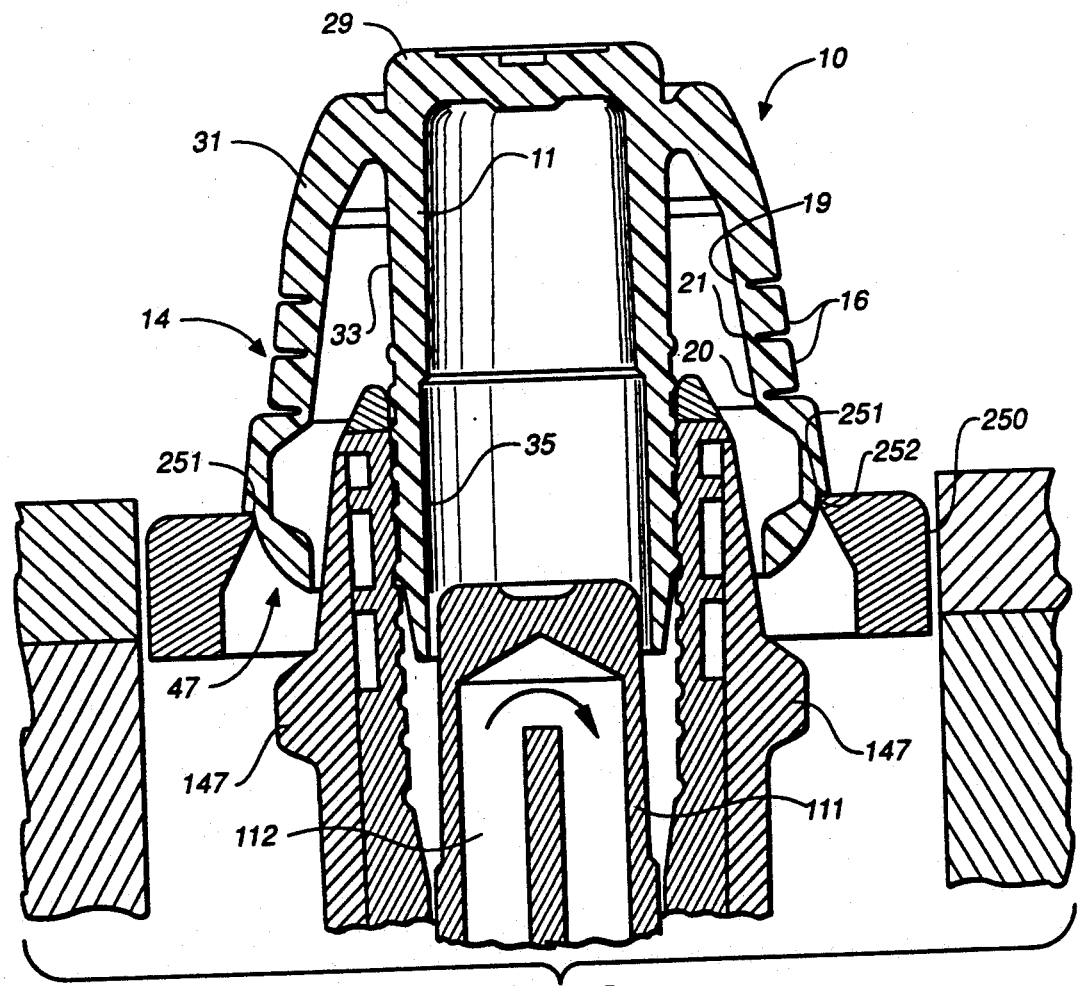
FIG._4

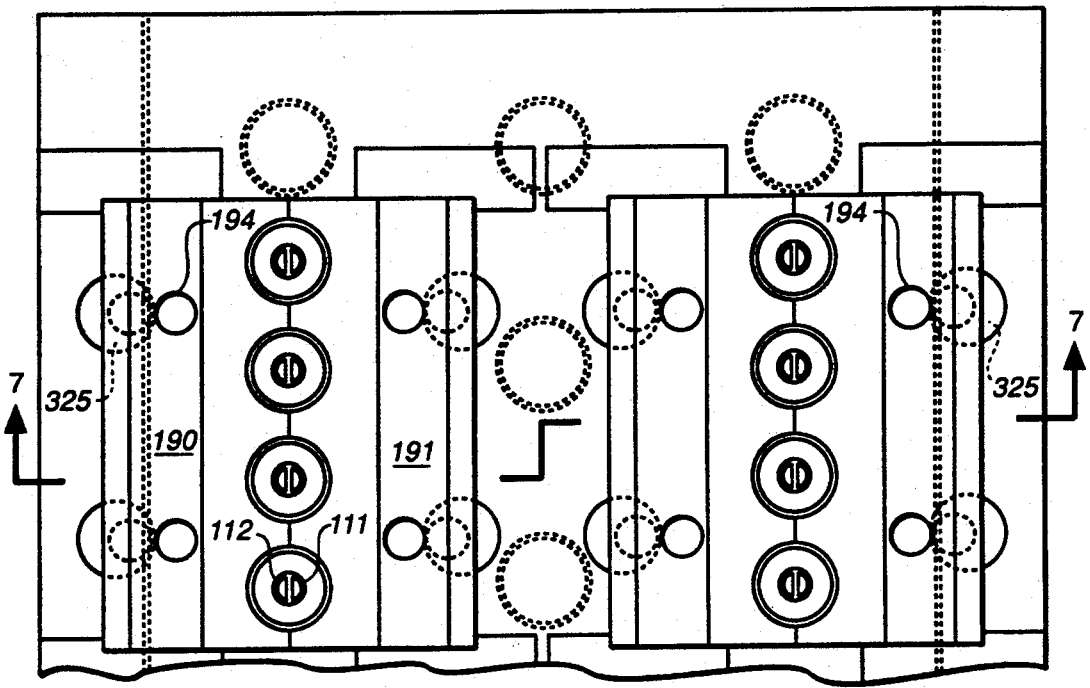
FIG._5
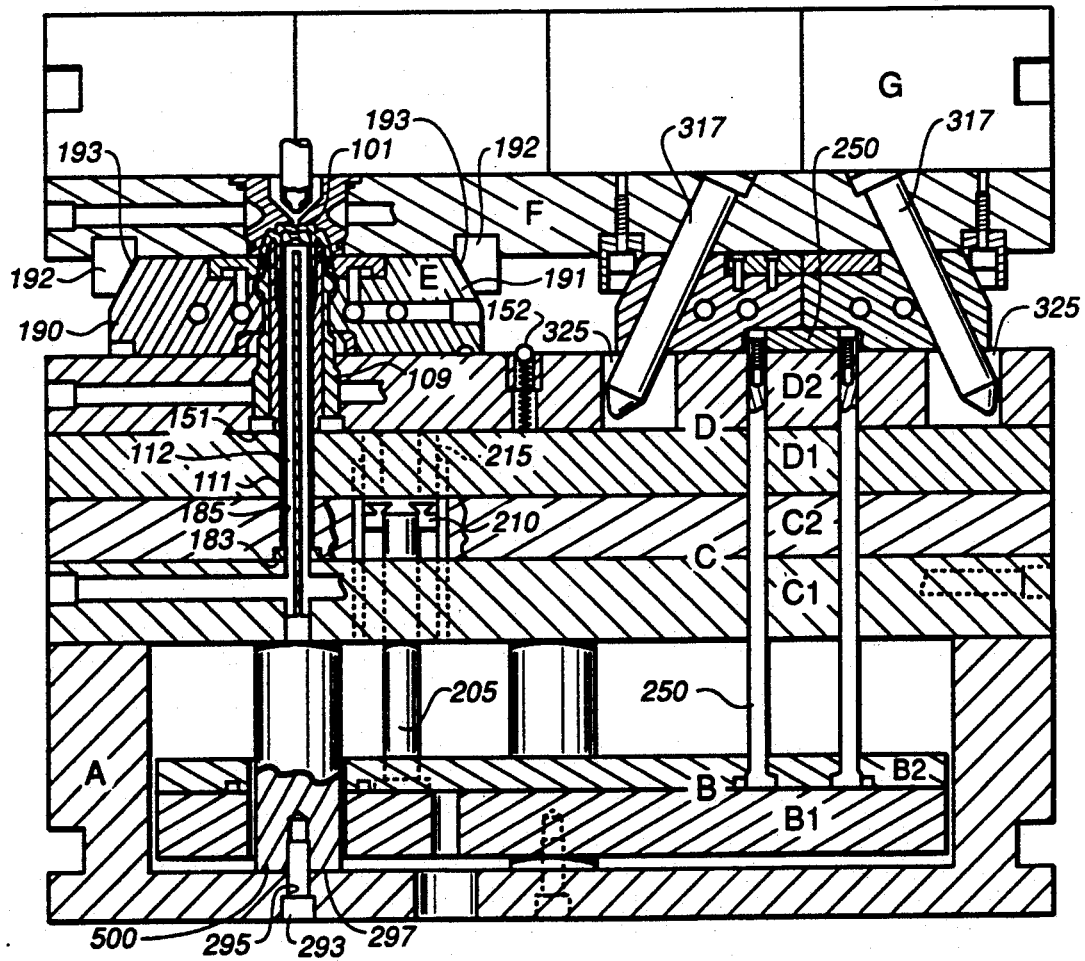
FIG._7

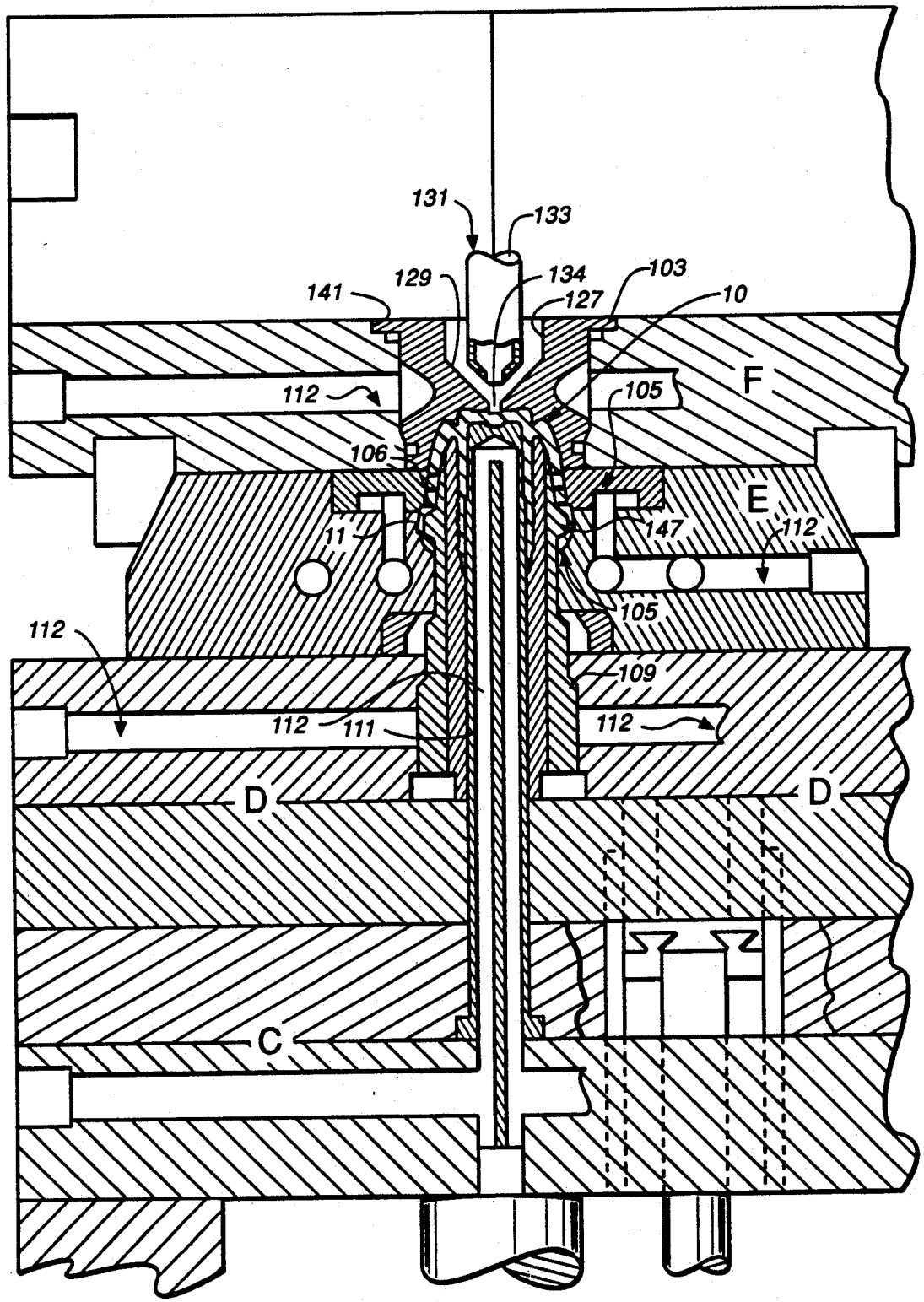
FIG._6

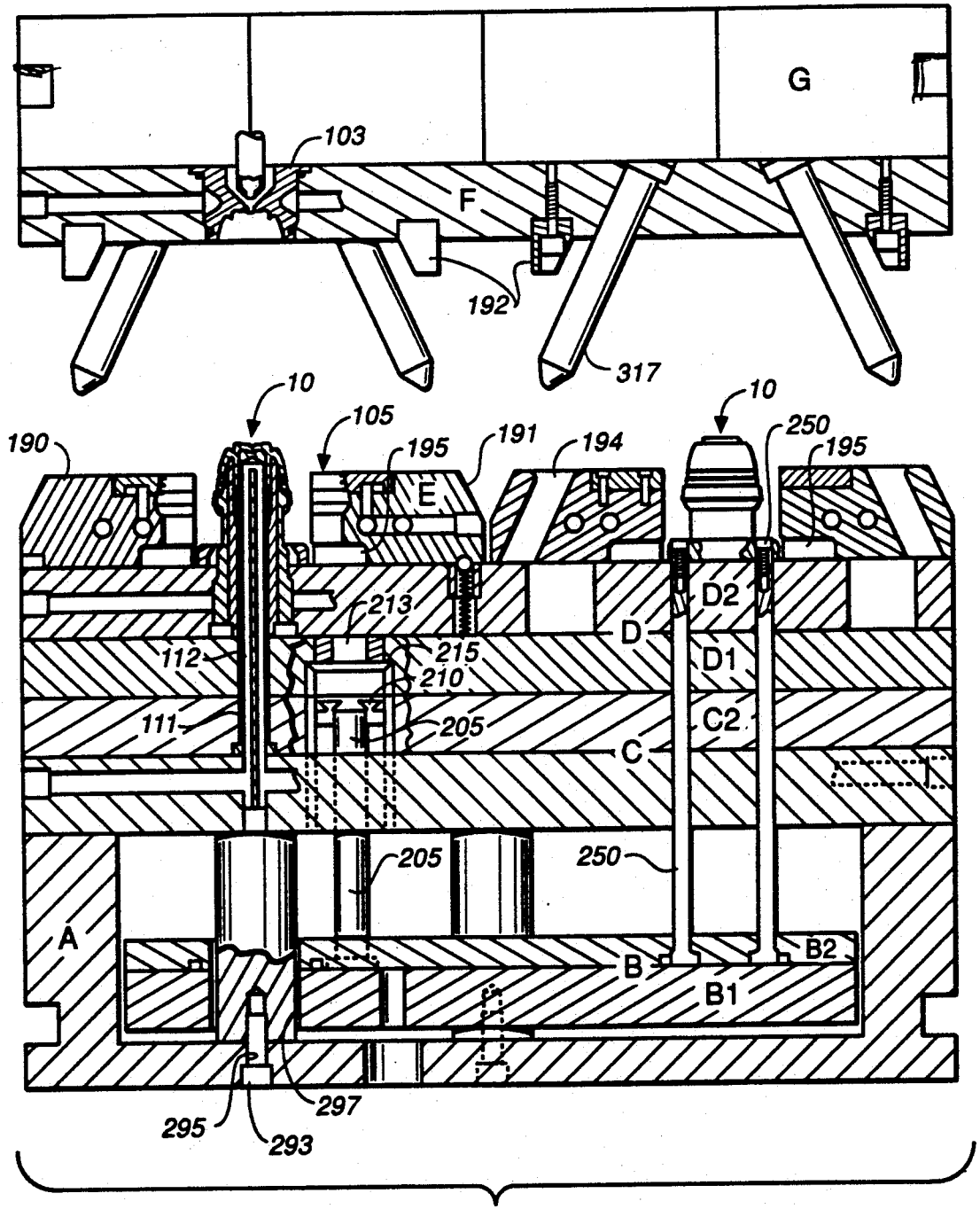
FIG._8

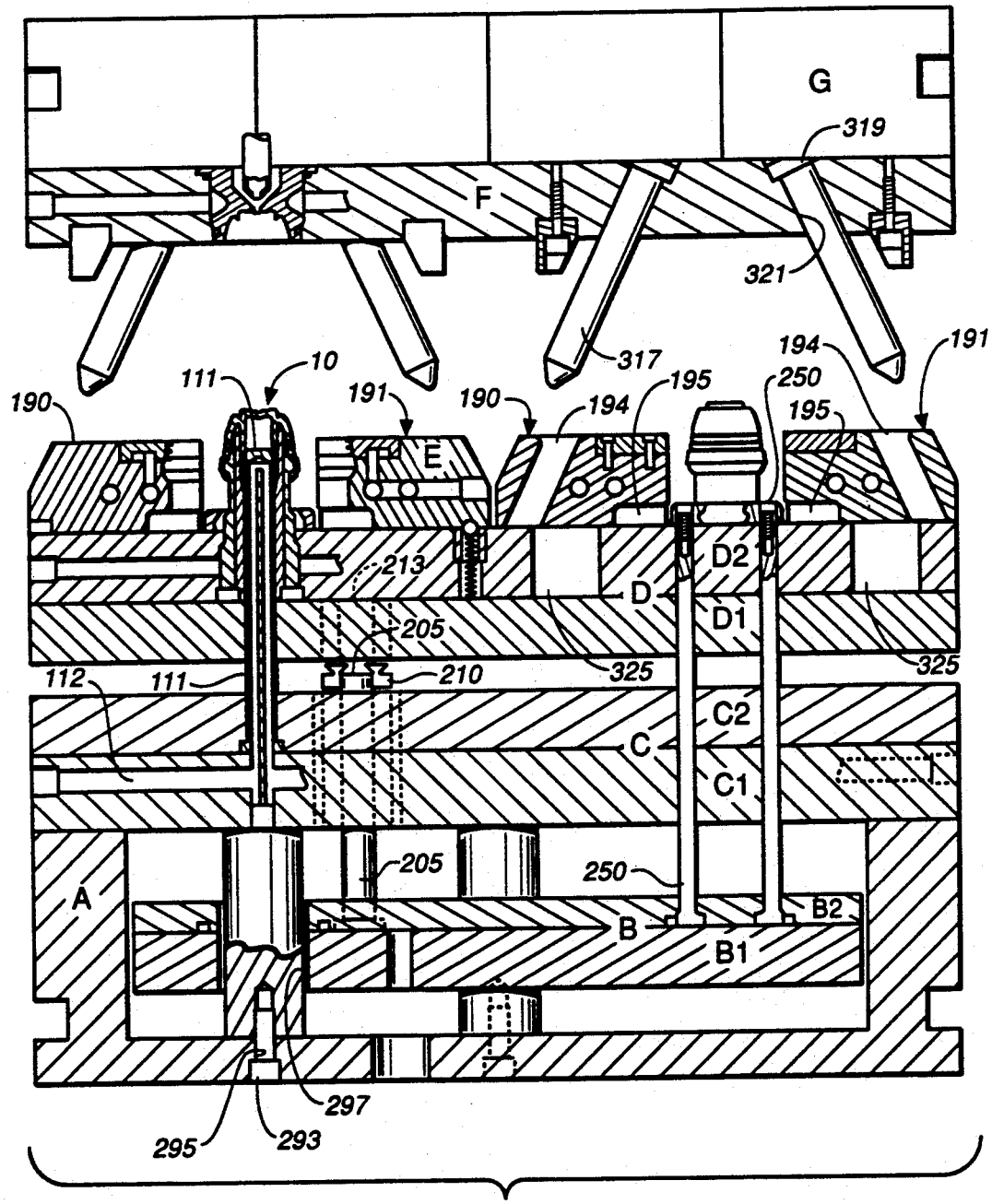
FIG._9

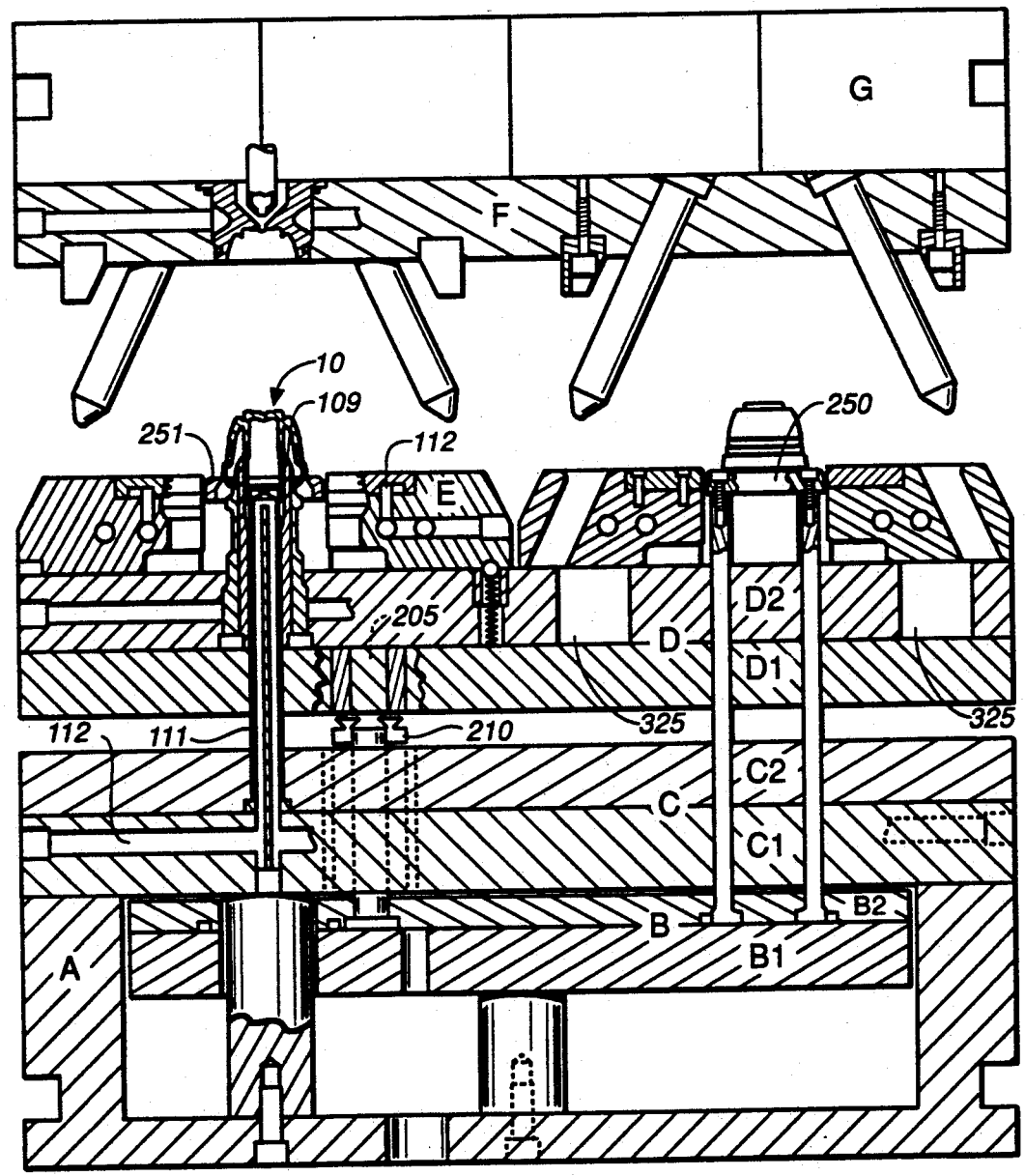
FIG._10

METHOD AND APPARATUS FOR INJECTION MOLDING

This is a division of application Ser. No. 394,934 filed Aug. 17, 1989.

FIELD OF THE INVENTION

This invention relates generally to safety closure devices for use on bottles containing pressurized beverages such as champagne or sparkling wines. More specifically, the invention relates to an improved safety closure device, and to an improved mold and method for making the new device.

BACKGROUND OF THE INVENTION

The internal pressure inside an unopened bottle of champagne or sparkling wine can be as much as 100-150 psi, especially if the contents of the bottle are warm or if the bottle has been shaken. Because of this pressure, a champagne cork can be propelled from the bottle at a velocity of well over 120 Kph. A cork traveling at such a speed can seriously injure the person that is opening the bottle as well as individuals that are standing nearby. The human eye is especially vulnerable to injury because the cup shape of the eye socket mirrors the cup shape of the typical champagne cork. Individuals standing near windows or mirrors that can be shattered by the force of the flying cork are also vulnerable to injury from flying pieces of glass. To make matters worse, as soon as the shrink wrap and wire restraining device are removed from the champagne or sparkling wine bottle, the corks can explode spontaneously. In such an instance there is no opportunity for the person opening the champagne to place a towel over the top of the bottle as a means of providing some protection against the dangers of the explosive release of the cork.

The problem of premature or inadvertent explosive release of champagne corks is exacerbated by the fact that many lower priced champagnes and sparkling wines are closed by molded plastic corks. Plastic corks possess an even greater tendency than natural corks to become dislodged as a result of internal pressure in the bottle. Wetness on the glass surface of the bottle as a result of condensation or seepage of the contents can also reduce friction between the surface of the glass and the surface of the plastic cork.

In an attempt to solve the problem of premature or inadvertent release of champagne corks, U.S. Pat. No. 4,474,302, issued October, 1984 to Goldberg, et al., discloses a closure device (referred to herein as the '302 device) that employs a helical tether strip of rounded cross-section that is integrally connected to a cap-plug portion and an outer retaining collar which fits over the neck of the bottle. When the tear strip is torn away, a helical tether strip remains interconnecting the plug or cork and the retainer collar. The cork or plug can thus be easily released from the bottle, and yet is restrained from flying free. In most instances such restraint is sufficient; however laboratory tests of the device showed that the helical tether would sometimes break when the cork was released from the bottle.

U.S. Pat. No. 4,564,114, issued Jan. 14, 1986 to Cole, discloses an improved tethered safety closure device (referred to herein as the '114 device) that is similar to the '302 device but differs from it in that the '114 device employs a tether of rounded cross-section that is folded upon itself, thereby making it stronger than the helical tether of rounded cross-section of the U.S. Pat. No. 4,474,302.

The present invention discloses a new tethered safety closure device that utilizes the folded tether design of the '114 device, but improves upon it by replacing the rounded cross-section tether portions with tether portions of rectangular cross-section. Surprisingly, unlike the rounded cross-section tethers, the rectangular cross-section tether portions do not significantly distort or collapse when the molded closure devices are removed from the mold or when they are initially placed on the bottles of champagne or sparkling wine. In addition, the closure device of the present invention incorporates an annular shoulder on the device's retainer collar as a partial means for removing the finished closure from the mold of the present invention.

U.S. Pat. No. 4,541,795, issued Sep. 17, 1985 to Cole, discloses a mold that is especially suited for making the tethered closure devices of the '302 and the '114 patents. As the '795 mold patent points out, the molding of a plastic closure device is typically carried out in an injection molding machine. Such machines usually employ a plurality of die or mold plates and, in appropriate cases, a movable core. The mold plates and core move once the piece is molded to separate and enable removal of the molded device from the mold.

Where, as is the case with the '302 and the '114 devices, and the improved plastic closure device of the present invention, there are two portions (i.e., a plug portion and a retaining collar) that extend substantially coextensively and coaxially with each other, the molding procedure and mold may be extraordinarily complex. With a simple cylindrical device, a collapsible mold core may be provided making removal of the molded part after molding relatively easy. However, in the present case, a collapsible core is not practical due to the presence of the plug portion that is coextensive and coaxial with the surrounding cylindrical collar. This problem is exacerbated in the present instance because the lower portion of the restraining collar contains an annular recess (for mating with a retaining ring on the bottle or other container) that has deep undercuts on both its inner and outer surfaces. Such undercuts make it very difficult to remove the closure device from the mold once the molding process is complete.

The mold of the U.S. Pat. No. 4,541,795 (referred to herein as the '795 mold) has multiple moving parts. It addresses the problem of the severe undercuts on the retaining collar by employing movable mold segments which include a gripping portion or means. The gripping means retain the closure device while the mold's outer core is extracted from the cavity between the plug portion and the inner surface of the closure. Once the core is extracted the gripping means separate along with the remainder of the mold segments to allow removal of the molded device.

Unlike the '795 mold, the mold of the present invention has relatively few moving mold parts. In addition, the mold has a novel stripper means to remove the molded closure device from the mold's outer core means. As those skilled in the injection molding arts will appreciate, the fact that the mold of the present invention has few moving parts makes it possible to have more cavities per mold (for the size of the mold), which in turn makes it possible to mold more closures per mold cycle. In addition, the design of the mold of the present invention permits placement of more cooling channels close to the molding surfaces. This results in greater cooling of the newly molded devices, which in turn shortens molding cycle times. Consequently, closure devices can be made faster and cheaper in the mold of the present invention than they could be made in the '795 mold.

DRAWINGS

The disclosure of the mold and closure of the present invention includes a written description and several drawings, of which:

FIG. 1 is an elevational view illustrating a closure device of the type to which the invention is directed, with the device being in place on a bottle.

FIG. 1A is a longitudinal section through the center line of the device of FIG. 1 to illustrate how the device fits on a bottle.

FIG. 2 illustrates the device of FIG. 1, after the webs that interconnect the tether strip have been torn and the plug has been removed, showing how the tether restrains the plug.

FIG. 3 is a longitudinal section through the center line of the device of FIG. 1 to illustrate the interior construction thereof.

FIG. 4 is a schematic full section view illustrating removal of the closure device from the mold after molding.

FIG. 5 is a plan view of the mold showing the location of eight closure device mold cavities; the section lines show the location of the elevations shown in FIGS. 7-10; the section line on the left half passes through the center of a closure device in place in the mold, while the right half passes through the mold between two closure devices mold cavities.

FIG. 6 is a schematic full section view showing the closure device of the invention being molded in the mold of the invention.

FIG. 7 is a schematic full section view of the mold of the invention at Time 1 (the mold is closed and the material of closure devices is about to be injected into the mold cavities of the mold); the left portion of the figure illustrates the mold and the position of the closure device of FIG. 1 at Time 1 when the device is molded in the mold of the invention; the right portion of the figure further illustrates the position of relevant mold parts at Time 1;

FIG. 8 is a schematic full section view of the mold of the invention at Time 2 (the mold has begun to open); the left portion of the figure illustrates the mold and the closure device of FIG. 1 at Time 2; the right portion of the figure further illustrates the position of relevant mold parts at Time 2;

FIG. 9 is a schematic full section view of the mold of the invention at Time 3 (the molded closure devices are being separated from the inner core mold parts); the left portion of the figure illustrates the mold and the closure device of FIG. 1 at Time 3; the right portion of the figure further illustrates the position of relevant mold parts at Time 3;

FIG. 10 is a schematic full section view of the mold of the invention at Time 4 (the molded closure devices are being separated from the outer core mold parts and thus are being removed from the mold); the left portion of the figure illustrates the mold and the closure device of FIG. 1 at Time 4; the right portion of the figure further illustrates the position of relevant mold parts at Time 4.

SUMMARY OF THE INVENTION

Very generally, the improved safety closure device 10 of the invention comprises a cap portion 27, a cylindrical plug portion 11 adapted to close the mouth of a sparking wine bottle 12 by frictional engagement with the bottle's interior facing surface 13, and a cylindrical retainer collar 14 that fits around the retaining ring or circumferential ridge found on the neck of bottles that hold champagne and other sparking wines. Retainer collar 14 is coupled to cap 27 and plug portion 11 by a redesigned and improved intercoupling section 15. The redesigned intercoupling section includes at improved rectangular cross section tether strip portions 16 that prevent collapse of the device as it is removed from the mold or when the device is initially placed on a bottle of champagne or sparkling wine. Tether strip 16 is integrally formed with and secured at its respective ends 17, 18 to cap 27 and collar 14. (Preferred safety closure devices of the invention contain one rectangular cross-section tether strip; less preferred safety closure devices of the invention can contain more than one rectangular cross-section tether.) In its "unopened" state, rectangular cross-section tether strip 16 is folded upon itself, and when folded and untorn along the length of the frangible webs, rectangular cross-section tether strip 16 sections are from about 0.050 inch (1.269 mm) to about 0.018 inch (0.457 mm) apart, and preferably from about 0.005 inch (0.127 mm) to about 0.018 inch apart. Also in its "unopened" state, rectangular cross-section tether strip 16 is joined to cap 27 and collar 14 along a portion of the length of the tether strip by frangible webs 19,20,21. The webs are of a thickness that permit the tether strip portions to be separated along the length of the frangible webs. In the preferred safety closure device of the invention, tether strip 16 is folded upon itself at least once and is of a length unfolded such that the attached capped plug portion may be removed from the bottle or the like but is restrained by the collar from flying free.

The mold and method of the invention are useful for forming a closure device 10 having a cap portion 27, a cylindrical plug portion 11 extending therefrom, and a cylindrical collar 14 extending substantially coextensively and coaxially with the plug portion spaced therefrom to provide an annular recess for receiving the open end of the bottle to be closed. The mold has a mold cavity that delineates the outer surfaces of the closure device to be molded. The cavity is partially defined by upper mold segments 103 that delineate the outer surfaces of the cap, and lateral mold segments 105 that delineate intercoupling section 15 and collar 14. Lateral mold segments 105 include means for molding rectangular cross-section tether strip(s) 16 and their interconnecting frangible webs 19,20, 21, and collar 14 with its annular shoulder 50. The mold cavity for the closure device 101 is further defined by a substantially cylindrical hollow outer core 109 which extends into the mold cavity and defines the annular recess in closure device 10 between collar 14 and plug portion 11. In preferred form the mold cavity is further defined by a substantially cylindrical inner core 111 that delineates the inner surfaces of the device's cylindrical plug portion. Inner core 111 preferably incorporates cooling means 112 within it. Outer core 109 is substantially cylindrical; it extends into the mold cavity 101 and delineates the annular recess in closure device 10 between collar 14 and plug portion 11. Outer core 109 includes portion 147 that mimics the bottle's circumferential ridge. Inner core 111 delineates the inner surfaces of the closure device's plug portion. The mold also includes plate portions, some of which are movable. The mold's inner and outer cores are attached to plate portions that do not move, while pushing means 205 and stripper means 250 are attached to plate B that does move by suitable supports 450. Sequential movement of the movable B plate (and the attached pushing means) enables pushing means 205 to push on plate D, thus pushing molded closure device 10 away from the mold's inner core 111. Additional movement of the B plate enables stripper means 250 to engage annular shoulder 50 on collar 14 of closure device 10. Still more movement of plate B enables stripper means 250 to push molded closure device 10 past outer core portion 147 (which mimics the bottle's circumferential ridge 34) and past the portion that delineates the plug portion's gripping ridges 37. As a result the molded device is freed from the mold. See FIGS. 4 and 10.

DETAILED DESCRIPTION OF THE INVENTION

The Closure Device

The improved safety closure device of the present invention is illustrated in FIGS. 1 through 4. In FIGS. 1 and 2 the safety closure device is shown mounted on the neck of a bottle 12 designed to hold pressurized liquids such as champagne or other sparkling wines. The device of the invention includes a cylindrical closure element or plug portion 11 and a retainer collar 14 that are joined by an improved intercoupling section 15.

The bottle 12 in FIGS. 1 and 2 is typical of bottles used to contain champagne and sparkling Wines. Such bottles often have elongated, tapered, cylindrical necks containing a circumferential bulge or ridge 34 (known to the trade as a "retaining ring" or "finishing bead") a distance below lip 25 at the top of the bottle. The circumferential ridge 34 protrudes from the side of the bottle with sufficient radius to provide a means for restraining or impeding objects or devices, fastened above or below it, from moving up or down the neck of the bottle. In the past, such objects and devices have included, for example, woven wire baskets used to restrain plugs or corks. In the present invention, the circumferential ridge 34 is used to restrain retainer collar 14.

The closure device of the invention is preferably formed of a molded unitary piece or a suitable resilient substance. While polymerized plastic (such as FDA approved 800 series polyethelene) is a preferable resilient substance because it allows the lower annular portion 47 of retainer collar 14 to expand over the bottle's circumferential ridge 34, other resilient substances are suitable as long as they are weak in shear when thin but strong in tension when thick. As used herein, "weak in shear when thin" means a substance that is manually tearable when used at the thickness of the thin frangible webs 19,20,21 that interconnect the untorn tether strip portions to cap 27 and collar 14. "Strong in tension when thick" means that, at the thickness of the tether strip, the substance is strong enough to withstand longitudinal strain caused by sudden release of the cork from the bottle.

For purposes of this invention, a suitable resilient substance will be moldable. A suitable resilient substance will also have sufficient resiliency to allow retainer collar 14 to stretch circumferentially but not break as it is inserted over the neck of the bottle, including the circumferential ridge 34. Following the expansion necessary to allow the tapered lower annular portion 47 on retainer collar 14 to pass over the circumferential ridge 34, a suitable material will still have sufficient resiliency to allow the collar to assume a shape that conforms generally to the contour of the outside of the bottle with sufficient force to be retained despite stresses exerted from the pressurized contents of the bottle.

Closure device 10 includes a cap 27 of generally cup-like shape. Cap 27 is comprised of a circular disklike top portion 29 integrally molded with a hollow cylindrical side portion 31. The diameter of the cap's circular top portion 29 is greater than the diameter of the opening in the top of the bottle at lip 25. The inner circumference of the cap's hollow cylindrical side portion is slightly larger than the outer circumference of lip 25 at the top of bottle 12.

Plug portion 11 is preferably hollow having an outer cylindrical wall surface 33 (FIG. 3) and an inner cylindrical wall surface 35. Plug portion 11 has an outer diameter at surface 33 that is very slightly smaller than the diameters of the opening at the top of the bottle and the upper inner portions of the bottle neck. This size differential allows plug portion 11 of closure device 10 to fit tightly down into the neck of the bottle. In the preferred device of the invention a series of parallel annular ridges 37 protrude slightly from the outer wall surface 33 about halfway down the length of plug portion 11. The width and height of the annular ridges are approximately equal. These annular ridges continue down the outer wall surface 33 of plug portion 11 to a point approximately at or slightly below the bottle's circumferential ridge 34 when closure device 10 is in place in bottle 12. When the closure device is in the bottle, outer circumferential wall 33 of the plug portion 11 supports the annular ridges 37 against the inner wall of the bottle neck. As a result, the annular ridges push against the inner facing surface 13 of bottle 12 helping to seal its contents.

Plug portion 11 is adapted to close the mouth of bottle 12 by frictional engagement with the interior facing surface 13 of the mouth. Intercoupling section 15 couples collar 14 to cap 27 on closure device 10. In the preferred device of the invention, intercoupling section 15 is comprised essentially of at least one rectangular cross-section tether strip 16 and interconnecting frangible webs 19,20,21 formed integrally in the intercoupling section. One end 17 of tether strip 16 is secured to cap 27, the other end 18 is secured to collar 14. Tether strip 16 is preferably folded once on itself and the two tether strip portions are interconnected by grooved frangible webs 19,20,21. The thickness and configuration of frangible webs 19,20,21 are preselected to be less than the thickness of tether strip 16. Tether strip 16 preferably contains an integral pull tab portion 42 at the area of its fold which provides an easy and convenient means for grasping the tether strip 16 prior to its separation as described below.

The finger-grip section of tab portion 42 of tether strip 16 may be suitably roughened, not shown, to help prevent the tab from slipping when grasped by a person wishing to separate the tether strip portions. In the closure device of the present invention, a plurality of parallel stays 43 preferably extend along the tab portion 42, the tab portion being thickened so as to be non-frangible from the free tip of the tab 42 to the end of the frangible web 21 at the fold 600 of the tether strap 16. This acts to stiffen and strengthen this section of tab portion 41. (See FIGS. 1 and 2.)

Retainer collar 14 is comprised of a hollow annular portion that fits around the top outside portion of the bottle neck. The interior shape of retainer collar 14 generally mirrors the contour of the outer surfaces of sparkling wine bottle 12. In the improved closure device of the present invention, collar 14 contains an annular shoulder 50 (see FIG. 3) that facilitates removal of the closure device from the mold of the invention. Just below the annular shoulder 50, collar 14 contains a tapered annular portion 47. The size and shape of the inner surface of annular portion 47 generally mirrors and approximates the shape and size of the lower portion of circumferential ridge 34 on bottle 12.

The location of annular shoulder 50 relative to the mold part that mimics circumferential ridge 34 is critical to the ability to remove finished molded closure device 10 from the mold of the present invention. As those skilled in the art will appreciate, the shape and position of circumferential ridges will vary depending on the size of the bottle and which manufacturer made it. As a result the shape and position of mold portions that mimic the circumferential ridges will differ as well. Although such variations make it impractical to list precise locations for the annular shoulder on any particular closure device (since the closure device of the present invention can be adapted for use on any of these bottles that have circumferential ridges), the following functional definition can be used without undue experimentation by those skilled in the art to determine what constitutes a proper location of the shoulder when the closure device is being adapted for a particular bottle.

When shoulder 50 is positioned correctly on collar 14, shoulder 50 functions to aid in the removal of the finished molded closure lo device from the mold. More specifically, during the mold's ejection process, the mold's stripper means 250 (which will be discussed more fully below) engages shoulder 50 and pushes against it. As a result, as stripper means 250 advances, the lower tapered annular portion 47 of collar 14 stretches circumferentially as it is pushed up and around the mold portion (referred to herein as 147) that mimics the bottle's circumferential ridge 34. If shoulder 50 is positioned too low on collar 14, stripper means 250 will inhibit the expansion required for the collar's lower tapered annular portion 47 to clear mold portion 147. On the other hand, if shoulder 50 is located too high on collar 14, stripper means 250 may disengage from shoulder 50 during the ejection process. When shoulder 50 is positioned correctly, the circumferential expansion of lower tapered collar portion 47, that results as molded closure device 10 is pushed by stripper means 250 up and around mold portion 147, causes the "expanded" collar to push against stripper means 250. This in turn helps secure edge 251 of stripper means 250 tightly against the lower edge of shoulder 50. When shoulder 50 is placed too high on collar 14, the expanded collar does not push against stripper means 250 as much, which makes it easier for stripper means 250 to disengage from annular shoulder 50 on collar 14.

By way of example, with regard to the bottle and closure device shown in the figures, the following are preferred: (1) the location of shoulder 50 must be as vertically shown, plus or minus 0.005 inch (0.127 mm) in order for removal of the device from the mold to function as described herein, (2) the inside diameter of edge 251 of stripper bar 250 must be within 0.002 inch (0.058 mm) of the relative positions that are shown in order for the device to be removed properly from the mold, (3) the shown shape of trough 252 is critical for proper functioning of removal of the device from the mold. Those skilled in the art, using the present disclosure, can adjust these exemplified tolerances, without undue experimentation, to fit other bottles used in the sparkling wine and champagne industries.

When tethered safety closure device 10 is installed on a sparkling wine bottle, collar 14, and especially lower annular portion 47, fits around the circumferential ridge 34 on the neck of the bottle and holds the collar in place. Additional security of the collar on the bottle neck is assured by providing sufficient thickness in the wall of the collar below annular shoulder 50 to prevent circumferential expansion and consequent upward movement of the collar 14 as a result of pressure in the bottle.

Tether strip 16 is folded upon itself a single time in the illustrated embodiment and is of a length unfolded such that plug portion 11 may be removed from the bottle. (Although the illustrated embodiment shows a single fold, other numbers of folds could be used.) However, regardless of the number of folds, the length of the tether strip unfolded is such as to restrain cap 27 and attached plug portion 11 from flying free of the bottle with the attendant possibility of injury. Preferably, the length of tether strip 16 is between 6 centimeters and 10 centimeters.

Tether strip 16 is interconnected with cap 27 of closure device 10 by frangible web section 19 and is connected to the collar 14 by frangible web section 20. The webs 19 and 20 are of a thickness and configuration preselected to be less than the thickness of tether strip 16 for reasons explained below.

When pull tab portion 42 of tether strip 16 is grasped and pulled by one wishing to open a bottle of sparkling wine, tether strip 16 separates from cap 27 and collar 14 along the length of the frangible portion of the tether strip because of a tearing of frangible web sections 19,20,21 along the path of grooves that separate rectangular cross-section tether strip 16. When tether strip 16 is torn along the path of the grooves, it still remains to interconnected cap 27 to collar 14, thus enabling plug portion 11 to be released from the bottle 12 without flying free.

Webs 19,20,21 may be continuous, or may be broken by a series of openings, not shown, which facilitate separation of tether strip 16. The strength of the webs is selected, however, to provide sufficient strength to maintain a cohesive structure until separation of the tether strip portions. Tether strip 16 is separable by manually causing the webs to tear. (If pressure within a bottle of sparkling wine builds to the point that the cork or closure device is released spontaneously, the explosive force of the closure device Will be the cause of a tearing of webs 19,20,21 between tether strip 16. However, as indicated below, the tether will keep the cork from flying free.) Following the tearing of the webs 19,20,21 as shown in FIG. 2, rectangular cross-section tether strip 16 remains attached to cap portion 27 and to collar 14. These attachments are preferably accomplished by means of a merging brought about by a gradual diminution of the depth of the groove separating the cap or collar material from the ends of the tether turns at terminal regions 17 and 18.

The improved closure device of the present invention has a rectangular cross-section tether rather than the round cross-sectioned ones of the prior art (e.g., the '114 and the '302 devices referred to in the Background section of this specification). (As used herein, rectangular cross-section tether means that in cross-section the tether is substantially like a rectangle having corners with right angles; in contrast, round cross-section tether means that in cross section the outer edge of the tether is rounded or substantially arc-like or curved.) In addition to being substantially rectangular in cross-section, tether 16 is preferably of a size and mass sufficient to prevent rupture under tensile stress in excess of about 200 psi at about 20° C. The new rectangular cross-section design of tether 16 is critical because it prevents intercoupling section 15 from collapsing when intercoupling section 15 undergoes longitudinal compression force in a direction parallel to the long-axis of closure device 10. This compression force occurs under the following two sets of circumstances: (1) when closure device 10 is being removed from the mold of the present invention, stripper means 250 exerts pressure at shoulder 50, which in turn must transmit the force via cap portion 31 to plug portion 11 in order to free parallel annular ridges 37 from outer core mold means 109; and (2) when closure device 10 is placed on a bottle 12 containing sparkling wine, pressure on cap 27 or its circular disklike top portion 29 is transmitted through intercoupling means 15 to collar 14, thus forcing collar 14 to momentarily stretch circumferentially so that the collar can slip over the bottle's circumferential ridge 34.

When longitudinal compression force is applied to the improved rectangular cross-section tethered device of the present invention, the spaces occupied by webs 19,20,21 collapse like an accordion, thus allowing one rectangular cross-section surface of tether 16 to make direct contact with or otherwise engage an adjacent rectangular cross-section tether surface. Such direct contact of these surfaces effectively transmits the compression force longitudinally up or down the closure device. Prior art tethered closure devices, such as the '114 and '302 devices, which have round cross-section tethers, do not allow the tether surfaces to make comparable direct contact with one another when longitudinal compression forces are applied to these devices. As a result, some of the compression force is channeled inwardly, and if the force is great enough, the intercoupling section of the device collapses. The more rectangular the tethers 16, the more efficient they will be in transmitting the compression force longitudinally. Furthermore, when the untorn rectangular cross section tethers are at least about 0.005 inch apart but not more than about 0.05 inch apart, and preferably not more than about 0.018 inch apart, the compression force is effectively transmitted up or down the closure device. With regard to a closure device designed to fit on a standard bottle used in the sparkling wine industry, a distance between the tethers 16 of about 0.005 inch to 0.018 inch also allows control of the direction of tearing in the illustrated closure device. These values can be adjusted by those skilled in the arts of mold designs, without undue experimentation, for closure devices that fit other standard bottle shapes and sizes.

Because of the design of the tethered safety closure device and the material used to construct it, the unitary tethered safety closure device of the present invention can easily be inserted on bottles containing champagne or sparkling wine. The thickness at the bottom of the retaining collar is selected to facilitate placing the device on the wine bottle. The resiliency of the material used to make the tethered safety closure device allows it to expand and contract as necessary to fit securely in and around the neck of the bottle. This resiliency can be increased with heat if the properties of the material so warrant.

In addition to providing the means for connecting cap 27 to retainer collar 14, intercoupling section 15 creates an integral tamper proof safety seal between cap 27 and collar 14 because it indicates by dismemberment if the product has been prematurely opened.

The Mold and Method

The mold of the invention is shown in FIGS. 6-10. Very generally, the mold comprises mold means 103, 105, which enclose mold cavity 101 that defines the outer surface of the closure device to be molded. A substantially cylindrical hollow outer core means 109 extends into the mold cavity and defines the annular cavity in closure device 10, including the inner surface of cylindrical collar 14 and the outer surface of cylindrical plug portion 11. In addition, a substantially cylindrical inner core means 111 may extend into the mold cavity; the inner core mold means define the inner surface of cylindrical plug portion 11 when the plug portion is hollow. See FIG. 6 for detail.

Referring now more particularly to FIG. 6, a preferred form of the mold of the invention is illustrated in position in a multi-mold plate injection molding machine. The mold cavity is defined by an upper mold segment means 103, lateral mold segment means 105, substantially cylindrical outer core mold means 109 and substantially cylindrical inner core mold means 111. Upper mold segment means 103 is formed to have a cavity surface defining the outer surface of the cup-like cap 27 of closure device 10. Lateral mold segment means 105 are shaped to form the outer surfaces of the closure device's intercoupling section 15 (comprising the tether region) and the outer surface of collar 14, including annular shoulder 50 and lower annular portion 47. Outer core mold means 109 is shaped to define the recess between cylindrical plug portion 11 and the following: collar 14, intercoupling section 15 and cap portion 27. Inner core mold means 111 defines the interior surface of the cylindrical plug portion 11 of closure device 10, which in the illustrated embodiment is hollow. Completing the mold means are multiple water or cooling means 112 within lateral mold segments 105, and at least one cooling means within cylindrical inner core means 111 and upper mold means 103.

It may be noted from FIG. 6 that lateral mold segment means 105 and outer core mold means 109 engage each other to close the mold cavity. Similarly, outer core mold means 109 and inner core mold means 111 engage at the lower end of plug 11 to close mold cavity 101. The outer wall of outer core mold means 109 is provided with a suitable shape to conform with the inner surface of the collar 14 and cup shaped portion of the cap 27, and includes an annular protuberance or circumferential ring 147 which forms the annular recess in the inner surface of collar 14. Rectangular cross-section grooves 106 are provided in lateral mold segments 105 at suitable locations to form rectangular cross-section tethers 16.

The injection mold, as may be seen in FIGS. 6 through 10, comprises mold plates that are described in detail below and which carry the various parts of the mold means that form mold cavity 101. The mold means that delineate the outer surfaces of the closure device are carried on movable mold plates, while those that delineate the device's inner recesses (i.e., inner core mold means 111) are attached to plates that do not move. Pushing means 205 and stripper means 250 are also attached to movable mold plates. In this way, after the device is molded, sequential movement of the movable plates enables the closure device to be removed from the mold. Since injection molding machines are well known in the art they will be not be described in detail herein other than with respect to the particular method of the present invention.

The mold illustrated in FIG. 6 includes an upper mold segment means 103 which has a recess 141 therein of dual stepped diameter. Upper mold segment 103, which is carried on a mold plate F, is provided with a recess 127 therein which also includes a frustoconical section 129. A hot tip or hot runner 131 of any suitable type known in the art is positioned in the cavity formed by recesses 127 and 129. Hot tip 131 has a central passage 133 therein through which molten material is injected into mold cavity 101. A corresponding passage 134 is provided in upper mold segment 103 aligned with the passage 133 to complete the route for the injected material to the mold cavity. At least one coolant passage 112 is preferably provided in the outer surface of upper mold segment 103.

The molding apparatus is constructed of a series of plates which will now be described. Plate A is lowermost, and contains recesses and spaces in which plate B can move. Plate A is attached to a standard molding machine (not shown). Plate A supports plate C by attachment means 293 at surface 297. Plate B consists of two metal plates B1 and B2 which are suitably united by means not shown. Stepped holes in B2 provide a means for fastening support rods 450 for stripper means 250 and pushing means 205 to plate B. plate C consists of two metal plates C1 and C2 that are joined by means not shown. Stepped holes 183 and 185 in plate C2 provide support and attachment for inner core mold means 111. Holes are also provided in plate C1 for the passage of pushing means 205. Matching holes are provided in plate C2 for the upper part of pushing means 205 and for suitable frictional engagement of cam 210, which will be described in more detail below. Holes are also provided in plates C1 and C2 for support rods 450 for stripper means 250.

Plate D consists of two metal plates D1 and D2 that are joined by means not shown. Holes are provided in plates D2 and D1 for the passage of support rods 450 of stripper means 250 and inner core mold means 111. A stepped hole 151 is provided in plate D2 to support outer core mold means 109 and fasten them to plate D. Holes 325 are provided in plate D2 to give clearance for slanted shoulder pins 317. A detente mechanism 152 consisting of a spring-loaded ball is provided in plate D2 to lock plate E in position after movement. Plate E consists of two movable portions 190 and 191 which separate during the ejection cycle. Plate E portions 190 and 191 are firmly preset together when the mold is closed by angle bars 192, which press against the angled surfaces 193 of plate portions 190 and 191. Plate portions 190 and 191 also contain angled holes 194 (FIGS. 8 and 9) into which slanted shoulder pins 317 descend and slide during mold closure. Plate portions 190 and 191 additionally provide grooves 195 for clearance for stripper means 250, and contain stepped holes that provide a housing chamber for the upper mold means 105 that mold intercoupling portion 15.

Lower ejector housing plate A, in the operation of the molding machine, is suitably supported, by means not shown, in a fixed position. Pushing means 205 and support rods 450 for stripper means 250 are attached to movable ejector plate B. Shoulder bolt 293 extends through passage 295 in plate A and attaches support post 500 to plate A.

A slanted shoulder pin 317, fixed to the mold plate G by a flange 319, extends through mold plate F, and through openings 321, 194 and 325 in mold plates F, E and D, respectively. Opening 325 is shaped so as to clear the end of angled pin 317 when plates F and G are moved vertically upward, as will be described below. A second slanted shoulder pin is provided as a mirror image to the pin 317.

It will be noted by comparing FIGS. 7 and 8 that, as plates F and G move upwardly, pin 317 exerts a lateral or horizontal component of force on part 190 of plate E in a direction away from the mold cavity. As stated above, a pin similar to pin 317 is provided on the opposite side of the mold cavity in a mirror image configuration. The horizontal forces exerted on plate E by pin 317 and its mirror image pin cause separation of lateral mold segment means 105 carried on plate portions 109, 191 of plate E along the parting plane. This causes a withdrawing of the rectangular cross-sectioned grooved portion (which forms tether 16 and webs 19,20,21) and the collar forming portion of lateral mold segment means 105 from engagement With newly molded closure device 10.

Cooling means 112 preferably circulate throughout the entire length of inner core mold means 111; such cooling aids in "setting" the molded closure devices, and thus shortens mold cycle times.

After the elapse of a period of time sufficient to permit a desired degree of solidification of the injected material, the molding machine first operates to move the die plates G, F, and E to the positions shown in FIG. 8 relative to the plates D, C, B and A. In this position, mold plates G and F and upper mold segment means 103 are separated from engagement with lateral mold segment means 105 and plate E. In addition, lateral mold means 105 and mold plate E are separated from the molded closure device 10. See FIG. 8.

In the condition shown in FIG. 9, movable plate B has been made to advance. Because cam 210 on pushing means 205 abuts shoulder 215 in opening 213 in plate D1 (see FIG. 8) advancement of movable plate B (to which pushing means 205 are attached) causes a concomitant movement in plates E, D2 and D1 Pushing means 205 passes through openings in plate C, which is stationary. Since mold plate C is stationary, inner core mold means 111 (which is attached thereto) is stationary as well. As a result, as mold plates D and E advance forward, molded closure device 10 is pulled away from the mold's inner core means 111. See FIG. 9.

The final stages of the ejection process are shown in FIG. 4 (which shows detail of how stripper means 250 engages annular shoulder 50 on the surface of retainer collar 14) and FIG. 10. These final stages are the most difficult of the ejection process since molded closure device 10 must be "pushed" up and over annular protuberance 147 on the outer wall of the mold's outer core means 109. They are accomplished by further forward movement of plate B, which is made to move in the following manner. Cam 210 is made to separate (by means not shown) from pushing means 205, thus allowing pushing means 205 to advance into opening 213 in plate D. Since both pushing means 205 and stripper means 250 are attached to movable plate B, as pushing means 205 moves into opening 213, plate B (and stripper means 250) advances as well.

Turning now to FIG. 4, which shows the stripper means in greater detail, it can be seen that stripper means 250 has a wedged edge 251 with a small trough or depression 252 in it at the point where stripper means 250 comes in contact with annular shoulder 50 on the outer surface of retainer collar 14. As the stripper means 250 advances forward, trough 252 in edge 251 allows increased frictional stability between edge 251 and annular shoulder 50. As plate B advances, stripper means 250 provides the force needed to push closure device 10 up and around annular protuberance 147 on the outer surface of outer core mold means 109.

As closure device 10 is pushed up and around annular protuberance 147, the portion of collar 14 that lies below annular shoulder 50 is distorted as it moves around the deep undercut on protuberance 147. The natural resilience of the moldable material permits collar 14 to regain its shape after passing over annular protuberance 147. Following separation of molded device 10 from the mold's outer core 109 the molded device falls free of the mold.

After achieving the positions shown in FIG. 10, the plates reverse their motions to return to the positions shown in FIG. 7, and the cycle is completed.

From the foregoing description, one of ordinary skill in the art can understand that the present invention is an improved safety closure device, injection mold and molding method are described. The safety closure device has a cap portion; a cylindrical plug portion extending therefrom; a cylindrical collar extending substantially coextensively and coaxially with the plug portion spaced therefrom to provide an annular recess for receiving the open end of the container to be closed; and an improved intercoupling portion comprised of at least one rectangular cross-section tether strip that is interconnected alone its edges by frangible webs and secured at its respective ends to the cap and the collar. The tether strip is folded upon itself at least once and is of a length that, after the frangible webs have been torn, the attached cap and plug can be removed from the bottle without flying free.

The mold has a mold cavity that delineates the outer surfaces of the closure device to be molded. The cavity is partially defined by upper mold segments that delineate the outer surfaces of the cap and lateral mold segments that delineate the intercoupling section and the collar. The lateral mold segments include means for molding the rectangular cross-section tether strip(s) and their interconnecting frangible webs, and the collar with its annular shoulder. The mold cavity is further defined by a substantially cylindrical hollow outer core which extends into the mold cavity and defines the annular recess in the closure device between the collar and the plug portion. In preferred form the mold cavity is further defined by a substantially cylindrical inner core that delineates the inner surfaces of the device's cylindrical plug portion. The mold preferably includes pushing means for separating the finished molded closure device from the mold's inner core and stripper means for separating the finished device from the mold's outer core.

Various modifications of the invention in addition to those shown and described herein will become apparent to those skilled in the art from the foregoing description and accompanying drawings. Such modifications are intended to fall within the scope of the appended claims.

What is claimed is:

1. A method for forming a closure device having a cap portion; a cylindrical plug portion extending therefrom; a cylindrical collar extending substantially coextensively and coaxially with said plug portion spaced therefrom to provide an annular cavity for receiving the open end of a container to be closed, said collar having an annular shoulder thereon; and an intercoupling section comprised of at least one tether strip that is secured at its respective ends to said cap and said collar, said tether strip being joined to said cap and said collar along a preselected length of said tether strip by frangible webs of a preselected thickness to permit said tether strip to be separated from said cap and plug and said collar along said preselected length, said method comprising: providing injection outer mold means enclosing an injection mold cavity for defining the outer surface of said closure device, providing substantially cylindrical hollow outer core means extending into said injection mold cavity and defining said annular cavity in said closure device including the inner surface of said cylindrical collar and the outer surface of said plug portion, providing substantially cylindrical inner core means extending into said injection mold cavity and defining an inner cylindrical cavity in said hollow cylindrical plug portion, providing stripper means for separating the molded closure device from the mold's outer core means, injecting moldable material into said injection mold cavity, providing pushing means for separating said molded closure device from said inner core, removing said outer mold means that define the outer surfaces of said closure device, advancing said stripper means so it engages said annular shoulder on said closure device's collar and pushes against it until the molded closure device is separated from said outer core and pushing said molded closure device forward until said device is free from the mold's inner core, said pushing to occur after the mold means that define the outer surfaces of the closure device are removed, but before the stripper means are advanced so as to engage the annular shoulder on the closure device's collar.

2. A method according to claim 1 wherein said injection mold means comprise means for forming the rectangular cross-section tether strip and the interconnecting frangible webs in the closure device's intercoupling sections.

* * * * *